United States Patent

Hausermann

[15] 3,663,785
[45] May 16, 1972

[54] METHOD OF EROSIVELY SHAPING A MASTER DIE

[72] Inventor: Elmer P. Hausermann, 4 N 224 Hawthorne, Bensenville, Ill. 60106

[22] Filed: Dec. 14, 1970

[21] Appl. No.: 97,993

Related U.S. Application Data

[63] Continuation-in-part of Ser. No. 21,559, Mar. 23, 1970, abandoned.

[52] U.S. Cl. ........................................219/69 M, 219/69 V
[51] Int. Cl. .........................................................B23p 1/12
[58] Field of Search ....................219/69 E, 69 R, 69 M, 69 V

[56] References Cited

UNITED STATES PATENTS 3,497,930    3/1970    O'Connor.......................219/69 M X
2,924,701    2/1960    Stamper...............................219/69 M Primary Examiner—R. F. Staubly
Attorney—Roger A. Schmiege

[57] ABSTRACT

A method of shaping electrodes for use in electrical discharge machining processes comprising the steps of preparing an oversize cavity in a master die member on an apparatus that provides oscillatory rotary motion to either a die member or a model electrode member used to form the cavity of the die member, providing an abrasive surface on the cavity of master die member and utilizing in conjunction with the master die an apparatus, similar to that used to form the cavity in the master die member, to abrade and form an electrode workpiece member to an electrical discharge machining electrode of the size of the model electrode member.

10 Claims, 3 Drawing Figures

Patented May 16, 1972

INVENTOR
ELMER P. HAUSERMANN
BY Roger Schmiege
ATTORNEY

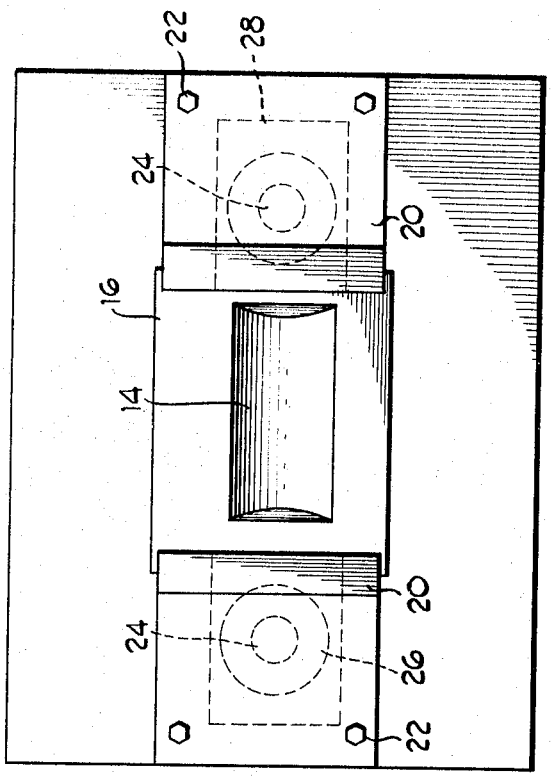
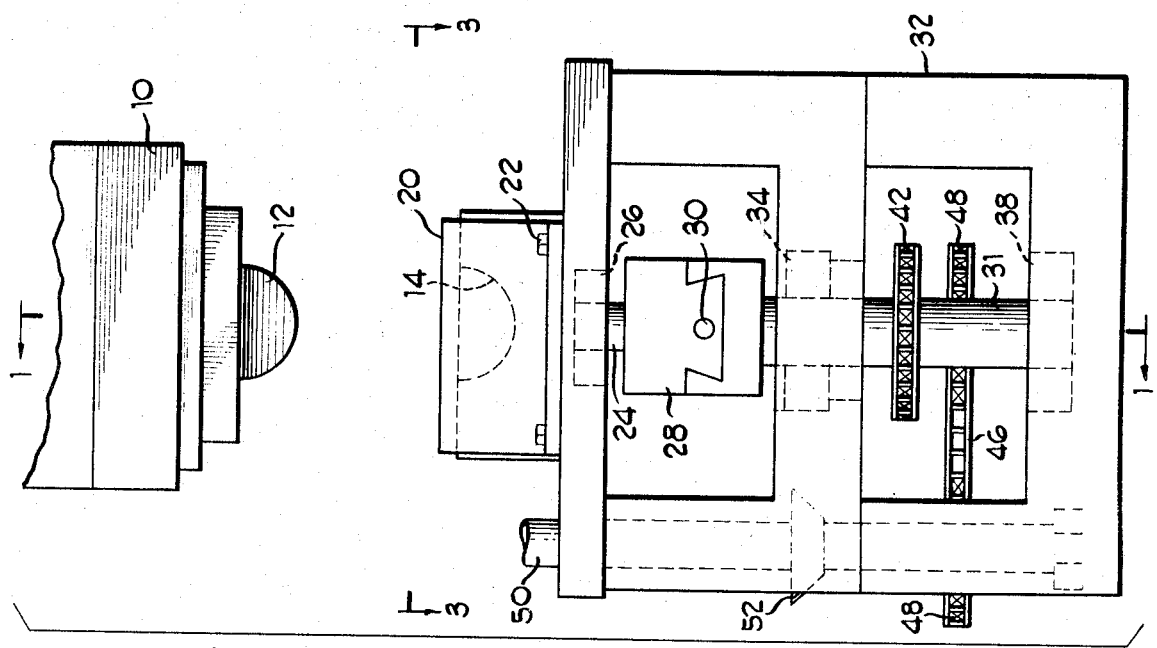

A METHOD OF EROSIVELY SHAPING A MASTER DIE

This application is a continuation-in-part of Ser. No. 21,599, filed Mar. 23, 1970, now abandoned.

BACKGROUND OF THE INVENTION

Prior to this invention, dies for forging and preparing molded plastic parts, punch press dies and the like, were normally prepared by milling the die cavity out of a piece of steel stock or by burning the die cavity by electrical discharge machining. The machining by electrical discharge machining used electrically conductive electrodes to sink the die.

The electrical discharge machining electrodes used in sinking a die were normally prepared by machining a model of the same form and dimensions as that of the part to be formed and this pattern in turn served as a model in the cutting of electrical discharge machining electrodes. The machined electrodes were normally finished by benching the roughly formed parts. The electrodes were normally cut from an electrically conductive workpiece, such as copper, silver, platinum, carbon or the like. The shaped electrodes were thereafter used to burn out a die cavity for forming parts.

As the knowledge of electrical discharge machining advanced, it was found that machining time and bench work involved in preparing electrical discharge machining electrodes was prohibitively uneconomical. This was primarily due to the amount of time required to prepare each electrode prior to use on an electrical discharge machine.

As a result of the economic problems, an invention was made wherein the electrical discharge machining electrodes could be prepared in a fully automated manner on a machine. Thus, the electrodes could be automatically prepared within the prescribed tolerance limits. One of the most advanced apparatus and methods for making electrical discharge machining electrodes is set forth in U.S. Pat. No. 3,465,480 entitled "Apparatus for Shaping Electrodes" issued to Elmer P. Hausermann.

In the aforementioned patent, apparatus is described which prepares electrical discharge machining electrodes from a blank workpiece and obviates the necessity of machining and bench working the electrodes.

The apparatus, briefly described, is a superposed set of carrying members or platens wherein one platen is moved in an oscillatory rotary motion with respect to the other.

By oscillatory rotary motion it is meant that the outer periphery of the member to which motion is applied, i.e., the movable member, does not revolve or spin around its central axis, but that any given point on the member will undergo a reciprocating type of circular motion, the amplitude of which is determined by the offset of the shafts applying motion to the movable member.

A master die member (with an abrasive surface) is mounted on one of the platens and an electrode workpiece member is mounted on the other platen in superposed relation to the master die. The electrode is abraded and forced into the master die through relative motion of the two members. In this manner, the electrode is formed to the shape of the master die. The electrode formed into the shape of the master die is thereafter utilized in an electrical discharge machine to sink a die identical (within the proper tolerance limits) with that of the electrode formed within the master die.

It will be noted from the description above that a master die member is required as an integral step in the preparation of electrical discharge machining electrodes using the automated apparatus. It has been found that an apparatus similar to that described above may be used to form the master die and in turn, the master die thus formed may be used in conjunction with the automated electrode forming apparatus in the subsequent step of preparing electrical discharge machining electrodes.

SUMMARY OF THE INVENTION

The instant invention is a method of shaping electrodes comprising the steps of preparing an oversize cavity in a master die member using a model electrode member by a given method and apparatus, operating on the master die so as to place an abrasive surface on the cavity surface of the master die member and using the master die member in conjunction with a similar apparatus and method as used to prepare the master die, to shape and reduce the size of an electrode workpiece member to that of the model electrode, i.e., to the desired electrode size for use in sinking die cavities.

When referring to "oversize" in the master die cavity, it is meant oversize in one plane only. As illustrated herein, the plane is the horizontal plane and the depth of the cavity is the same as that of the model electrode member as hereinafter described.

The method of this invention is essentially a three-step method:

The first step of forming an electrode member by the method of the instant invention is the formation of an oversize cavity in a master die member. By "master die" it is meant a die member that may be used repeatedly to form electrical discharge machining electrodes from an electrode workpiece.

Making the master die comprises the steps of mounting a die workpiece member on a first mounting member or platen and mounting an electrical discharge machining "model electrode" member, having the dimensions of the electrode ultimately formed, on a second mounting member in parallel superposed planar relation to the die workpiece member. The model electrode member and die workpiece member are mounted in a manner whereby at least one of the members may be moved toward the other while maintaining their parallel planar relationship. Mounting in association with at least one of said members, comprised of the electrode member and die workpiece member, eccentric movable drive means that cause oscillatory rotary movement in a plane perpendicular to that plane of movement between the die workpiece member and electrical discharge machining electrode member when one is moved toward the other. Applying oscillatory rotary motion, (described above) to at least one of said members, the amplitude of which is controlled by the amount of offset or eccentricity of the drive means connected to said movable member. (This amplitude may be varied by adjusting means associated therewith). Moving the die workpiece member and electrical discharge machining model electrode member into contact with each other while oscillatory rotary motion is applied, either continuously or intermittently, to at least one of said members so as to oscillate the same in its own plane, to thereby produce a master die member, having a cavity which is oversize relative to said model electrode member by an amount equal to the total amplitude of said oscillatory rotary motion.

The second method step of the instant invention is the formation of an abrasive surface on the master die member. The master die workpiece member may be in the form of a block of metal and formed into an oversize metal master die cavity by the action of electrical discharge machining through the model electrode member which burns the die cavity into the block of metal (preferably steel) by spark discharge. In the event that the block is steel the burning by spark discharge will roughen the surface sufficiently to leave the surface with the ability to abrade materials coming in contact therewith.

Alternatively, the oversize master die cavity may be formed in a thermoset resin such as epoxy, in which case the surface of the master die cavity is made abrasive through addition of an abrasive material to the thermoset resin composition prior to the formation of the master die cavity.

The details of the preparation of the oversize master die cavity set forth in the method step above for either a metal master die cavity or a plastic master die cavity will be more completely understood from a reading of the detailed description hereinbelow in conjunction with the drawings.

The third and last method step of this invention is the utilization of the apparatus and oversize master die cavity member to form electrodes. In this step, the oversize die cavity formed in step one above having an abrasive surface thereon, is mounted on a first member and an electrical discharge machining electrode workpiece member, preferably a carbon block, is mounted on a second member in superposed parallel planar relation to the master die cavity member. The master die member and workpiece member are mounted in a manner whereby at least one of the members may move toward the other. Eccentric drive means, that are adapted to apply oscillatory rotary motion in a plane perpendicular to the plane of movement between the electrode workpiece member and master die member when one is moved toward the other, is mounted in conjunction with at least one of said members consisting of the workpiece member and master die member. Positive pressure is applied to one of the members consisting of the master die member and the electrode workpiece member, in order to move them into contact with each other while oscillatory rotary motion is applied to at least one of the members. In this manner, the electrode workpiece member is forced into the cavity of the master die member and abraded therein to form an undersize electrical discharge machining electrode. The electrode thus formed is undersize with respect to the master die cavity by an amount equal to the total amplitude of the oscillatory rotary motion applied to one of the members. The adjustment of the amplitude is such that the dimensions of the electrode member produced will equal those of the model electrode member. The electrode thus formed is used in the electrical discharge machining of die members.

The invention will be more fully understood from the following description of the drawings in which the preparation of a steel master die member as described in the first method step of this invention and in which:

FIG. 2 is a side elevation of the apparatus shown in FIG. 1;

FIG. 3 is a top sectional view taken on lines 3—3 of FIG. 2.

Figure 1:
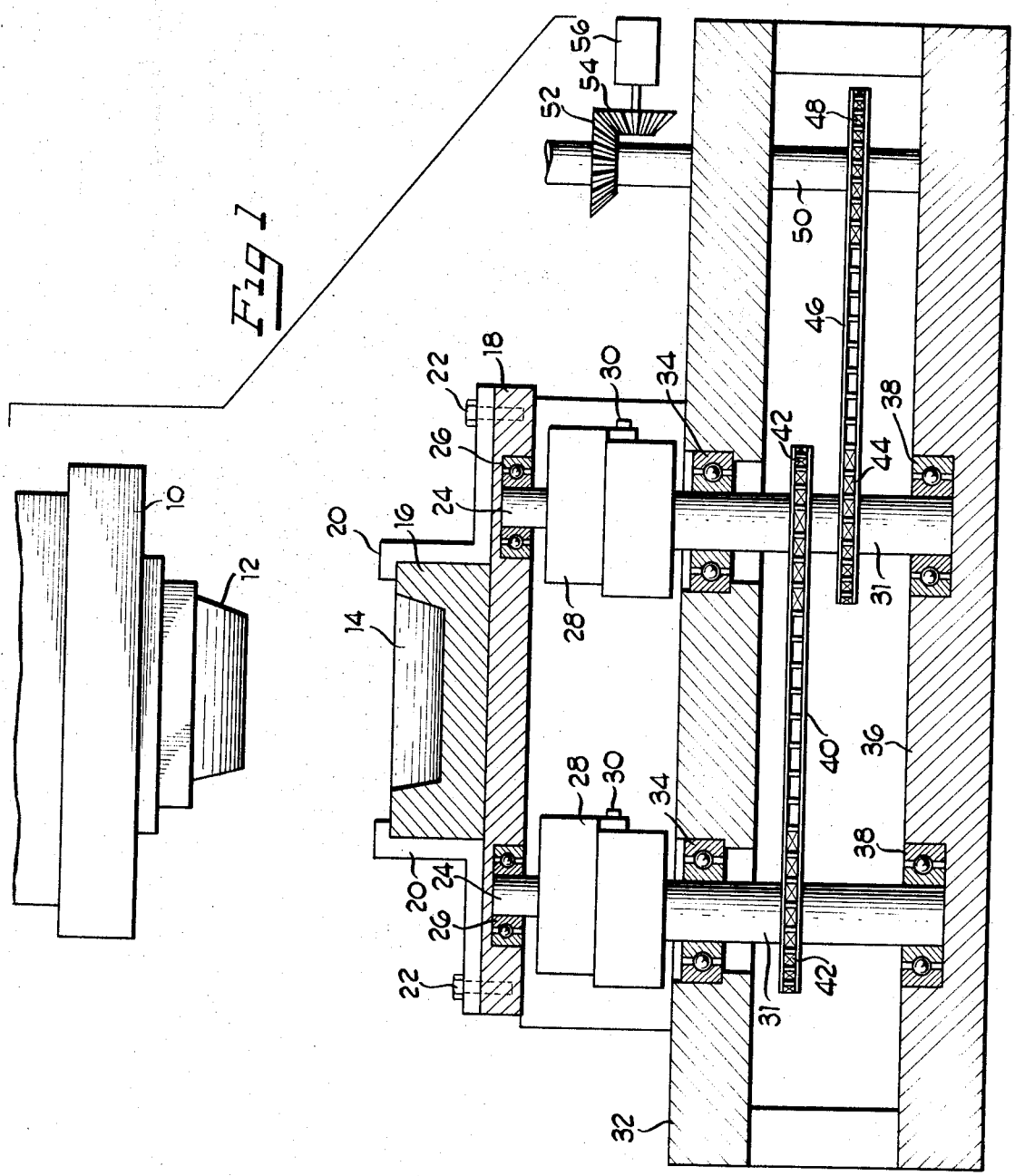
FIG. 1 is a front elevation of the apparatus of this invention used to form the master die member.

Referring to the drawings, FIG. 1 illustrates an apparatus on which the first method step of this invention may be practiced. In the illustrated apparatus, a master die member is mounted on an apparatus capable of transmitting rotary oscillatory motion to the die member and the apparatus is in turn mounted beneath an electrical discharge machine, i.e., the electrical discharge machining electrode is superposed over the master die member.

As shown, the electrical discharge machine ram generally represented as 10 is provided with an electrical discharge machining electrode 12 mounted thereon. The electrode 12 is mounted to print dimensions as are used to sink a conventional die cavity or mold.

Die member 16 is mounted on a base carrying member or platen 18 of apparatus designated as 8 which may be subjected to oscillatory rotary motion as described herein. The die workpiece member 16 is mounted on platen 18 by means of clamps 20 that are retained by set screws 22 on base platen 18.

Base platen 18 is mounted on shafts 24 which are journaled in platen 18 and carried within bearings 26 at the base of platen 18.

The shafts 24 are attached to adjustable boring heads 28 which may be adjusted to the right or left as shown in FIG. 1 to provide a greater or lesser degree of offset for shafts 24 mounted on heads 28. The retention of adjustment to the right or left is provided by an adjusting screw 30 which prevents the adjustable boring head from moving after having been adjusted with the desired offset or eccentricity.

The base of the adjustable boring heads 28 is attached to shafts 31 which shafts are journaled in frame member 32 and are carried by bearings 34. Shafts 31 extend downwardly to base member 36, which is the lower portion of frame 32 and are journaled therein and carried by bearings 38.

It will be noted that shaft 24 is offset to the right from shaft 31, i.e., the adjustable boring head is offset to the right. This offset will cause eccentric movement between shafts 31 and 24 which will subject platen 18 to an oscillatory rotary motion.

Shafts 31 carry sprockets 42 which are joined by chain 40. The right shaft 31 contains a second sprocket 44 mounted beneath sprocket 42 on which chain 46 is mounted. Chain 46 and sprocket 44 joins right shaft 31 with sprocket 48 on shaft 50.

Shaft 50 extends upwardly and is rotated by gear set 52 and 54 through shaft 58. Shaft 58 is, in turn, powered by motor 56. It will be noted that the motion applied to shaft 58 may be manual as well as by motor power.

FIG. 2 shows a side elevation of the apparatus shown in FIG. 1 and it will be noted that the adjustable boring heads 28 may be adjusted through a slot 60 to increase or decrease the offset on shaft 24 with respect to shaft 30.

FIG. 3 shows the master die 16 with its impression 14. It will be noted that shaft is shown as concentrically aligned with shaft 30 instead of eccentrically offset as shown in FIG. 1.

OPERATION

As the electrical discharge machining ram 10 is lowered, electrode 12 is superposed over blank die member 16. The electrical discharge machine is activated and platen 18 oscillated. The degree of movement is dependent on the offset or eccentricity of shaft 24 with respect to shafts 31 through adjustable boring head 28. As shown in FIG. 1, when the upper portion of head 28 is placed to the right, oscillatory movement results from the eccentric position of shaft 24 with respect to shaft 31. The motion applied causes the die cavity to be larger than the electrode used to sink the die by an amount equal to the total distance the master die moves from center in each direction during each revolution of the eccentric shafts.

Shafts 24 are rotated by activating motor 56 which turns gear set 52 and 54 on shaft 50. Alternately shaft 50 may be turned manually. This activation rotates sprocket 48 and transmits motion through chain 46 into sprocket 44 located on right shaft 31. Sprockets 42 on the right and left shafts 31, transmit motion to each other through chain 40. When sprockets 42 turn, both shafts 31 rotate within bearings 34 and 38. The adjustable boring heads 28 are in turn revolving and the offset oscillatory motion caused therein is in direct proportion to the adjustment of the adjustable boring heads as shown in FIG. 1.

The amount of offset can be varied from one ten-thousandths to a quarter in. or more, depending upon the movement desired on platen 18. The amount of oscillatory rotary motion provided will be commensurate with the manner in which it is desired to have the electrode cavity 14 cut within die member 16. The size will, of course, be larger than the electrode 12 which oversize amount will be equal to the offset applied to boring heads 28. For example, if the offset is 0.100 inch the size of the cavity will be the size of 12 plus 0.200 inch.

The above description illustrates the preparation of a master die from a metal block such as steel using electrical discharge machining to burn and erode the oversize cavity therein. The oversize master die cavity is formed with an abrasive surface on the die cavity by the action of the spark discharge from the electrical discharge machine. As described, oscillatory rotary motion may be applied while the electrical discharge machine is eroding the cavity. It is preferred, however, to partially erode the cavity, withdraw the electrode and rotate the master die by the application of oscillatory rotary motion, drop the electrode into the cavity for further eroding, withdraw the electrode and continue in this manner until the die cavity is completed. The amount of rotation of the master die cavity using any given point on the surface thereof as a reference may be through an arc of from 1° to 180° or more while the electrode is withdrawn until a total of 360° arc are covered, i.e., there is one total revolution around the given point. The movement while the electrode is withdrawn may be from one-three hundred sixtieth to one-half or more of a total revolution or oscillatory rotary movement. This intermittent burning, withdrawing and applying rotary oscillatory motion, as well as continuous burning while applying rotary oscillatory motion is referred to herein generally as the application of rotary oscillatory motion.

The master die may also be prepared from a thermoplastic composition, and the following description of the preparation of a thermoplastic master die utilizes the same apparatus and method to obtain the oscillatory rotary motion as that described hereinabove in conjunction with the preparation of a steel die cavity.

In preparing the thermoplastic master die, molding sand or other moldable material is placed within the confines of a container which is mounted on that apparatus described hereinabove, in the same manner as was the steel blank die member. The sand may be other moldable material, however, for purposes of illustration is referred to herein as sand. The electrical discharge machining model electrode is lowered into the sand within the container while oscillatory rotary motion is applied to the container. The rotary motion is preferably applied intermittently, as described above with respect to the sinking of an oversize master die cavity by spark discharge, i.e., the model electrode is dropped into the sand, raised from the sand, rotary motion is applied to the sand container, i.e., up to one-quarter or one-half of a total revolution, i.e., up to 180° arc, and the model electrode is again placed in the sand to create a displacement in the sand. The displacement by the model in the sand forms a cavity or impression in the sand which is larger in dimension (commensurate with the offset of the two eccentric shafts) than those dimensions of the electrical discharge machining electrode model used to form the impression in the molding sand. Thus, the cavity formed in the molding sand is larger than the model used to form the cavity by an amount equal to the total distance the molding sand container moves from center in each direction during a complete oscillatory rotary revolution.

The cavity, thus formed in the molding sand, is sealed with a suitable sealant such as shellac and filled with plaster or other dimensionally stable hardenable material to provide a cast member of those oversize dimensions of the cavity formed in the sand.

The plaster cast is allowed to harden, removed from the sand and treated with shellac or other suitable coating material to prevent absorption of liquids thereon.

A curable thermoplastic or thermoset composition such as an epoxy resin, is mixed with an abrasive material such as silicon carbide, tungsten carbide, aluminum oxide or the like. A cross-linking, (curing) agent, for example an amine, is added to and mixed throughout the epoxy composition. The cast member obtained as set forth above, is placed on a level surface within a container and the plastic-abrasive composition prepared as above, is poured over the cast member. In this manner, the thermoplastic-abrasive composition forms a die cavity by forming around the plaster cast. The resin composition is allowed to cure (harden) and the cast member is removed therefrom. The impression that is left in the plastic resin-abrasive composition after the cast is removed, serves as the oversize master die cavity. The impression or cavity may be sand blasted to expose the abrasive components and provide a more suitable cutting surface.

An alternative method of forming the resin-abrasive master die cavity member is to utilize a solid thermoset resin such as an epoxy and intersperse a curing agent and abrasive components throughout. This composition is thereafter used in place of the molding sand. The displacement by the electrode model in the epoxy composition will then provide the master die cavity directly from the plastic without the intermediate steps of making an oversize cast member. It is necessary, of course, that the abrasive material be dispersed throughout the resin composition and it is desirable that the composition be cured prior to removing the model from the composition. This preparation normally requires heating sufficiently to bring about curing within a very short period of time to prevent distortion of the walls of the cavity while they are being formed. Thus, the specific thermoset utilized will require given curing agents and given curing temperatures. These variables are well understood by those skilled in the art.

In the steps of making either the steel master die cavity or the thermoplastic master die cavity as set forth above, means are provided for obtaining identical electrode members using the master die cavity member in the method of the instant invention. This means of providing identical electrodes requires that matching edges be placed on the model electrode used to form the impression in the molding sand or the steel block which matching edges are also placed on the electrode workpiece, e.g., blocks of carbon, for use in forming the electrodes. The method of registering the model electrode or electrode workpiece with respect to the die member forms no part of the instant invention and is a step which is familar to those skilled in the art of die sinking.

Other modifications in the preparation of either thermoset plastic master dies or steel master dies will also be readily understood by those skilled in the art.

The master die prepared from either a block of metal or a plastic composition, is placed in an apparatus similar to that described in conjunction with preparation of the steel master die, set forth above, to reduce the electrode workpiece to the size of the model used to form the master die cavity.

Though the invention has been illustrated with respect to one specific embodiment thereof, it will be understood by those skilled in the art that this is by way of limitation, but for purposes of illustration only and that the scope of the invention is set forth in the claims attached hereto which should be construed as broadly as is consistent with the prior art.

I claim:

1. A method of forming an electrode member for use in an electrical discharge machining operation comprising the steps of mounting a model electrode member, having the dimensions of the electrode to be formed, in parallel relation to a die workpiece member, operating upon said die workpiece member with said model electrode member to form a cavity in said die workpiece member and in conjunction with such operation applying oscillatory rotary motion to one of said model electrode and die workpiece members so as to oscillate the same in its own plane to produce a master die member having a cavity which is oversize relative to said model electrode member by an amount equal to the total amplitude of said oscillatory rotary motion, providing an abrasive surface on said master die member, mounting an electrode workpiece member in alignment with said master die member and moving said members into contact with one another to force said electrode workpiece member into said master die member while conjointly applying oscillatory rotary motion to one of said members whereby through an abrasion operation said electrode workpiece member is formed into an electrode member which is undersize relative to said master die member by an amount equal to total amplitude of said lastmentioned oscillatory rotary motion, and controlling the latter amplitude so as to be equal to the amplitude of said firstmentioned oscillatory rotary motion whereby the dimensions of the electrode member produced by said abrasion operation will be equal to the dimensions of said model electrode member.

2. A method in accordance with claim 1 where the operation on said die workpiece member by said model electrode member to form a cavity in the latter comprises an electrical discharge machining operation.

3. A method in accordance with claim 2 where the step of applying oscillatory rotary motion to one of said model electrode and die workpiece members is carried out by intermittently discontinuing said electrical discharge machining operation by withdrawing said model electrode from the cavity of said die workpiece members, moving one of said members through a segmental portion comprised of from 1° to 180°, that is from one-three hundred sixtieth to one-half of one complete rotary oscillatory movement, placing said model electrode in the die cavity again for a continuation of said electrical discharge machining operation, and repeating the withdrawal and segmental movement of said one member and subsequent electrical discharge machining steps until said one member has been moved through at least one complete oscillatory rotary movement.

4. A method in accordance with claim 2 where the step of applying oscillatory rotary motion to one of said model electrode and die workpiece members is carried out simultaneously with said electrical discharge machining operation.

5. A method in accordance with claim 2 where said abrasive surface is formed on said master die member by means of spark discharge during said electrical discharge machining operation.

6. A method in accordance with claim 1 where the step of operating upon said die workpiece member with said model electrode member to form a cavity in said die workpiece member comprises filling a container with molding sand or the like to provide a sand container member to serve as said die workpiece member, forcing said model electrode member into said sand container member to form a cavity in the sand and in conjunction with such operation applying oscillatory rotary motion to one of said model electrode and sand container members so as to oscillate the same in its own plane to provide a cavity which is oversize relative to said model electrode member by an amount equal to the total amplitude of said oscillatory rotary motion, filling said cavity with plaster and allowing the same to harden to cast an oversize model electrode member, placing said oversize model electrode member in a thermoset-abrasive composition to form a cavity therein, and curing said thermoset-abrasive composition and removing said oversize model electrode member therefrom to form said master die member.

7. A method in accordance with claim 6 where the step of applying oscillatory rotary motion to one of said model electrode and sand container members is carried out by intermittently removing said model electrode member from said sand container member, moving one of said members through a segmental portion comprised of from 1° to 180°, that is from one-three hundred sixtieth to one-half of one complete rotary oscillatory movement, again forcing said model electrode member into said sand container member, and repeating the separation and segmental movement of said one member and further insertion of said model electrode member into said sand container member until said one member has been moved through at least one complete oscillatory rotary movement.

8. A method in accordance with claim 1 wherein the operation on said die workpiece member by said model electrode member to form a cavity in the latter comprises the step of filling a container with a plastic composition containing an abrasive and curing agent, to serve as the die workpiece member, forcing said model electrode member into said plastic container member to form a cavity in said plastic and in conjunction with such operation applying oscillatory rotary motion to one of said model electrode and plastic container members so as to oscillate the same in its own plane to provide a cavity in the plastic which is oversize relative to said model electrode member by an amount equal to the total amplitude of said oscillatory rotary motion while simultaneously curing said plastic composition and removing said oversize model electrode member therefrom to form said master die member.

9. The method of claim 8 where heat is applied to said plastic to aid in curing the plastic.

10. The method of claim 8 where the step of applying oscillatory rotary motion to one of said model electrode and plastic container members is carried out by intermittently removing said model electrode member from said plastic container member, moving one of said members through a segmental portion comprised of from 1° to 180°, that is from one-three hundred sixtieth to one-half of one complete rotary oscillatory movement, again forcing said model electrode member into said plastic container member, and repeating the separation and segmental movement of said one member and further insertion of said model electrode member into said plastic container member until said one member has been moved through at least one complete oscillatory rotary movement.

* * * * *

Notice of Adverse Decision in Interference

In Interference No. 98,389 involving Patent No. 3,663,785, E. P. Hausermann, METHOD OF EROSIVELY SHAPING A MASTER DIE, final judgment adverse to the patentee was rendered Mar. 28, 1974, as to claims 1, 2, 4 and 5.

[*Official Gazette July 2, 1974.*]